United States Patent

[11] 3,530,817

| [72] | Inventor | William J. Garvey |
| | | Rte. 1 Indian Trail Road, Barrington, |
| | | Illinois 60010 |
| [21] | Appl. No. | 779,562 |
| [22] | Filed | Nov. 27, 1968 |
| [45] | Patented | Sept. 29, 1970 |

[54] PNEUMATICALLY ACTUATED DEVICE AND ARRANGEMENT FOR MOUNTING SAME
8 Claims, 6 Drawing Figs.

[52] U.S. Cl. .................................................. 116/106,
116/112, 116/114.5, 169/42, 222/3, 239/414
[51] Int. Cl. .................................................. G08b 17/00
[50] Field of Search .......................................... 116/101,
104, 106, 112, 114.5, 117; 169/42; 222/3, 6, 28,
39, 54, 129, 136, 164, 463, 145, 402.21; 239/414,
428; 137/6, 72

[56] References Cited
UNITED STATES PATENTS

| 1,779,463 | 10/1930 | Connor | 116/106 |
| 2,034,179 | 3/1936 | Franklin | 116/106 |
| 2,575,110 | 11/1951 | Kerr | 73/296X |
| 2,793,651 | 5/1957 | Gomez | 116/112X |
| 2,912,144 | 11/1959 | Luddecke | 222/402.21 |
| 3,236,418 | 2/1966 | Dalle et al. | 222/145X |
| 3,244,137 | 4/1966 | Garvey | 116/106 |
| 3,391,367 | 7/1968 | Messick | 116/2X |

Primary Examiner—Louis J. Capozi
Attorneys—Ronald L. Engel, Daniel W. Vittum, Jr. and Gomer W. Walters ABSTRACT: An improved fire alarm device includes a container for pressurized propellant and a whistle operatively connected to the container by valve means which, when actuated, release pressurized propellant so as to cause a warning signal to be emitted. The valve means is actuated by a spring biased, pivotally mounted lever normally restrained by thermally responsive means adapted to permit the lever to pivot so as to actuate the valve when the ambient temperature exceeds a predetermined temperature. The device is pivotally mounted such that the device pivots to a predetermined position when the useful supply of pressurized propellant therein is less than a predetermined amount.

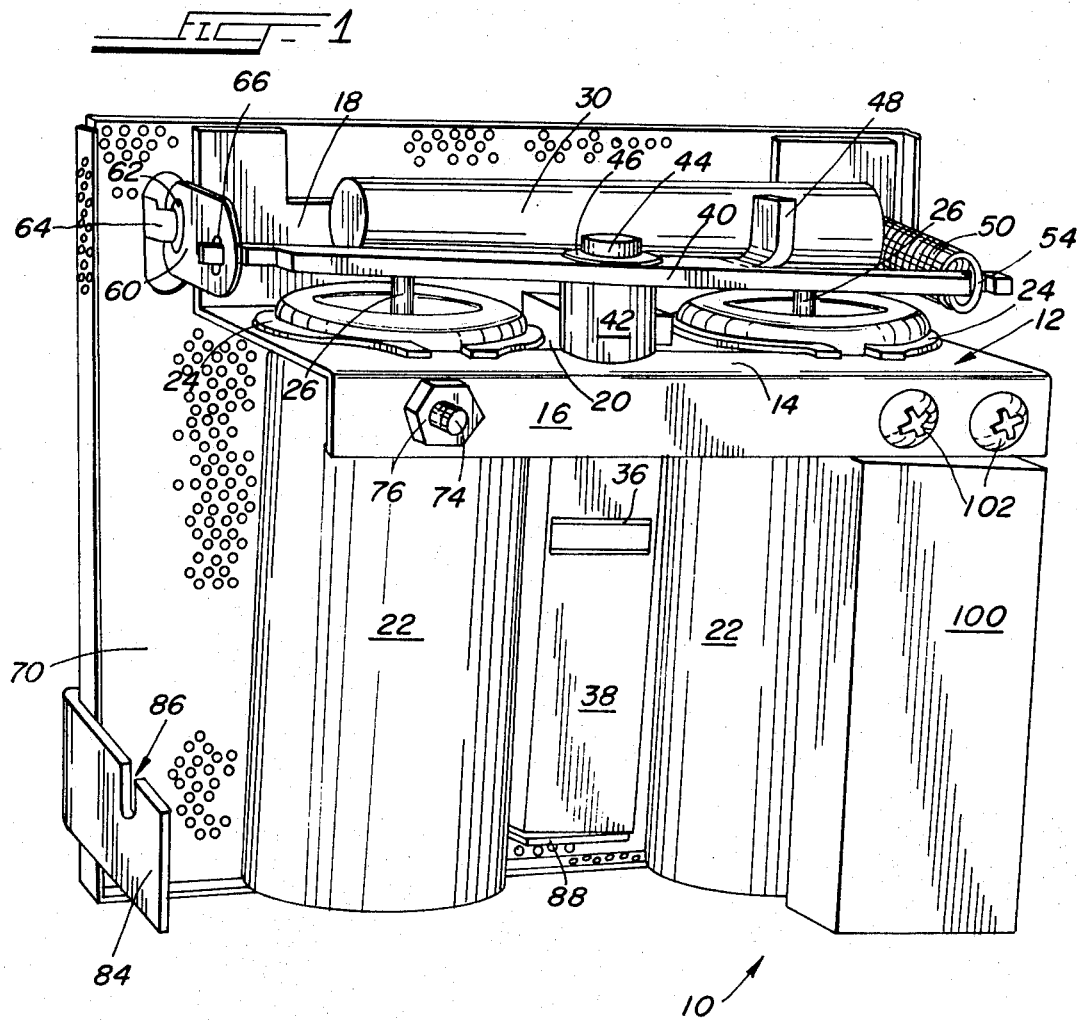
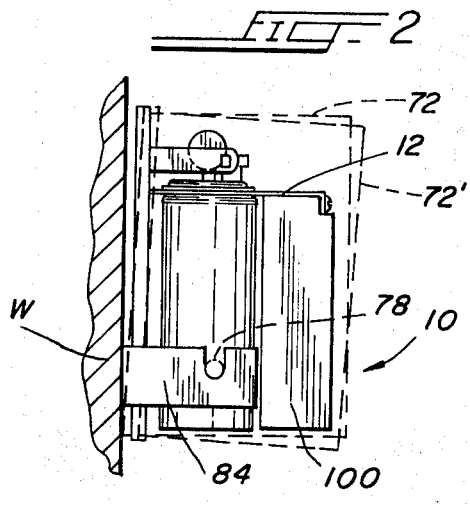

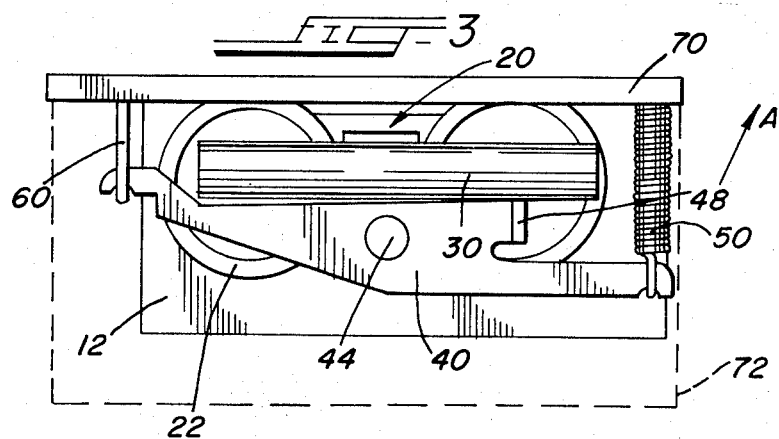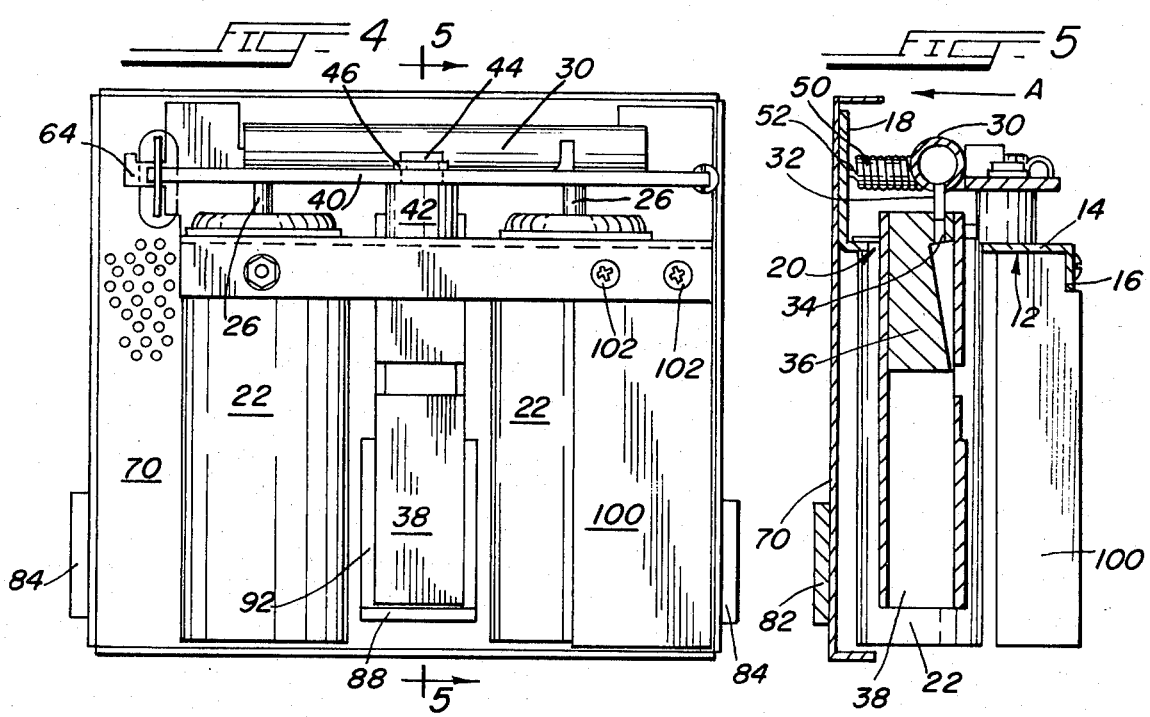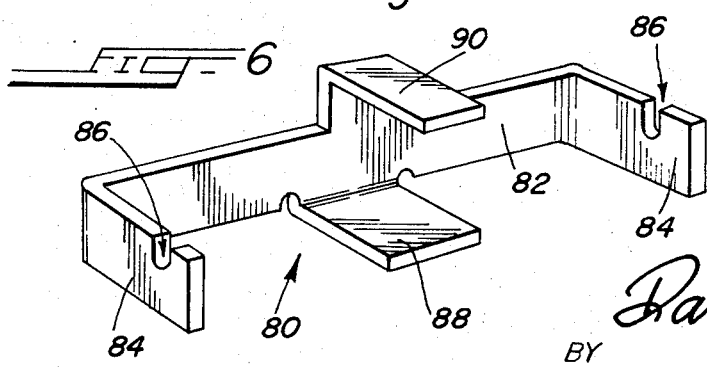

PNEUMATICALLY ACTUATED DEVICE AND ARRANGEMENT FOR MOUNTING SAME

BACKGROUND OF THE INVENTION

1. Field of the Invention

This invention relates to fire alarm devices and is concerned primarily with apparatus which automatically emits an audible warning signal when the ambient temperature reaches a predetermined level.

2. Description of the Prior Art

Automatic fire alarm devices are of course known in the art. It is conventional in such devices to employ a container of compressed propellant with a fusible plug which is disposed in an outlet tube so as to function as a thermally responsive valve. When the ambient temperature reaches a predetermined level, the plug melts and the propellant is released and thereafter passed through a sound-emitting device. However, as the propellant escapes, the molten plug is cooled and solidified by the escaping, expanding vapors, thereby wholly or partially blocking the outlet tube. It is, therefore, necessary that the ambient temperature actually reach a temperature in excess of the predetermined melting temperature for the propellant to be effectively released. Furthermore, the fact that the fusible plug must be positioned internally in the outlet tube precludes its direct exposure to the surroundings. Thus, there is always a delay in emission of the warning signal corresponding to the time necessary for heat from the surroundings to be conducted to the fusible plug.

Accordingly, it is a prime object of the present invention to provide a new and improved fire alarm device employing a valved container which stores pressurized propellant, a sound-emitting member adapted to emit a shrill alarm upon release of the pressurized propellant, and a thermally responsive member adapted to cause the opening of the valve controlling the emission of the pressurized propellant when the ambient temperature reaches a predetermined level.

It is another object of the present invention to provide a fire alarm device of the character described wherein the thermally responsive member is disposed externally of the valved container of pressurized propellant.

It is yet another object of the present invention to provide a fire alarm device of the character described wherein an empty container of pressurized propellant may be replaced with a fresh container whereby the sound-emitting member may be reutilized.

A still further object of the present invention is to provide a fire alarm device of the character described wherein the thermally responsive member is replaceable for resetting and adjustment of the device.

Still another object of the present invention is to provide a fire alarm device of the character described which is easily fabricated from inexpensive and readily available parts, which is quickly installable, and which is reliable in operation.

Applicant's U. S. Pat. No. 3,244,137 describes an automatic fire alarm device in which a sound-emitting device disposed on the outlet stem of a can of pressurized propellant is urged to a valve opening, sound-emitting position by a biasing spring, but is normally restrained from such movement by a fusible link which melts when ambient temperature reaches a predetermined level.

A further object is to provide an improved valve-actuating arrangement to increase the convenience and reliability of operation of such a fire alarm device.

A related object of the present invention is thus to provide an improved mounting arrangement for such a fire alarm device, one in which the supply of pressurized propellant may be quickly and easily replaced and one in which the sound-emitting capability of the device may be quickly and easily tested without alteration of the structural elements.

A still further object is to provide a fire alarm device of the character described which has greater capacity and useful life in the prior art devices and in which the useful life of the device is subject to visual measurement.

SUMMARY OF THE INVENTION

The foregoing and other objects, advantages, and features may be achieved with a fire alarm device comprising: frame means; container means for holding pressurized propellant, the said container means being mounted on the frame means; valve means for normally retaining the propellant in the container means, the said valve means being adapted when actuated to release the pressurized propellant from the container means; signal means for emitting a warning signal upon release of the pressurized propellant; a lever pivotally mounted on the frame means, pivotal movement of the lever being adapted to actuate the valve means; biasing means mounted between the frame means and the lever urging the lever to pivot so as to actuate the valve means; and thermally responsive means mounted between the lever and the frame means for restraining pivotal movement of the lever, the thermally responsive means being adapted to permit the lever to pivot under the urging of the biasing means when the ambient temperature exceeds a predetermined temperature, whereby the device emits a warning signal whenever the ambient temperature reaches a predetermined level.

The subject invention further includes apparatus for mounting a pressurized propellant actuated device comprising: a mounting bracket including a pair of projecting arms, with each arm having a pivot pin receptacle; a pair of pivot pins on the device, each pin being adapted to be pivotally received in a corresponding one of the pin receptacles; retaining means for limiting the pivotal movement of the device between a first position and a second position, the center of gravity of the device being such that it is normally disposed in its first position when the supply of pressurized propellant is greater than a predetermined amount and that, when the supply of pressurized amount and that, when the supply of pressurized propellant is less than the said predetermined amount, the device pivots to its second position.

DESCRIPTION OF THE DRAWINGS

An exemplary embodiment of the present invention is shown in the accompanying drawings, in which:

FIG. 1 is a perspective view of a device produced in accordance with the present invention;

FIG. 2 is an end view thereof showing the device mounted on a wall or other supporting structure;

FIG. 3 is a top plan view thereof;

FIG. 4 is a front elevational view thereof;

FIG. 5 is a sectional view taken substantially along line 5–5 in FIG. 4; and

FIG. 6 is a perspective view of the mounting bracket for the device.

DETAILED DESCRIPTION OF THE PREFERRED EMBODIMENTS

With reference to the drawings, FIG. 1 illustrates a fire alarm device 10 produced in accordance with the present invention. Device 10 comprises a main bracket 12 which comprises a generally flat land section 14, a depending front flange 16 and an upstanding rear flange 18. Land section 14 has an opening 20 (see FIGS. 1, 3, and 5) provided therein, and the ends of opening 20 are rounded so that the respective upper ends of a pair of aerosol containers 22 may be disposed therein. As best shown in FIG. 1, each of the aerosol containers 22 is held in place by a split ring 24 which may be removed to facilitate the removal of container 22 from bracket 12.

Each of the containers 22 has a central upstanding outlet tube 26, and tube 26 forms a part of the valve for container 22. The valve (one conventional version of which is shown in applicant's aforesaid U.S. Pat. No. 3,244,137) is designed such that movement of tube 26 in a direction out of its normal vertical position results in the freeing of pressurized propellant from the interior of container 22. The valve is also of such character that tube 26 normally returns to its vertical, propellant containing position following displacement.

A manifold 30 is provided, and the upper end of each tube 26 is received in manifold 30. A suitable connecting reducer (not shown) may be employed such that the end of a given tube 26 may be removably positioned in manifold 30 in order to facilitate the exchange of propellant containers. Manifold 30 preferably takes the form of a hollow tube, with the ends thereof being closed. Manifold 30 has a central opening in the bottom thereof from which a tube 32 projects downwardly. Tube 32 is received within an opening 34 provided in a whistle core 36 of a whistle assembly 38 (see especially FIG. 5). Whistle assembly 38 projects downwardly through opening 20 in land portion 14 of bracket 12.

Since manifold 30 is held in place by being mounted on tubes 26, it will be seen that movement of manifold 30 in the direction indicated by the arrow A in FIG. 5 would result in the displacement of tubes 26 from their normal vertical positions such that pressurized propellant is released into the interior of manifold 30, from where the propellant passes via tube 32 into whistle core 36, such that an audible warning sound is emitted.

As previously noted, tubes 26 are disposed in their vertical position normally, and, as a result, actuating means are provided in order to effect the displacement of manifold 30 in the direction of arrow A whenever ambient conditions rise above a predetermined temperature. The actuating means comprises a lever 40 pivotally mounted on bracket 12 by means of a pivot post 42 which has a projecting pin 44 which passes through an opening provided in lever 40. A suitable retaining ring 46 maintains lever 40 on pivot post 42. A vertical actuating lug 48 is integrally provided on lever 40, and lug 48 contacts manifold 30 when lever 40 is disposed in the position shown in the drawings. Pivotal movement of lever 40 in a counterclockwise direction (as shown in FIG. 3) results in lug 46 pushing manifold 30 in the direction of arrow A (as shown in FIGS. 3 and 4).

Biasing means, in the form of a spring 50 secured at one end 52 to flange 18 and at its other end 54 to one end of lever 40, normally urge lever 40 to pivot in the counterclockwise position (as shown in FIG. 3) so as to cause manifold 30 to be displaced thereby opening the valves in containers 22.

Lever 40 is normally prevented by retaining means from pivoting in a counterclockwise direction as shown in FIG. 3 in response to the action of spring 50. The retaining means take the form of a fusible link 60, one end of which has an opening 62 provided therein that passes over a bracket 64 projecting from flange 18, and the other end of which has an opening 66 which passes over the other end of lever 40. As a result, lever 40 and manifold 30 are normally disposed in the positions shown in the drawings such that the valves of containers 22 are closed and such that an audible warning signal is not emitted. However, when predetermined ambient conditions exceed a predetermined temperature, fusible link 60 melts, thereby permitting lever 40 to pivot under the influence of spring 60 so as to displace manifold 30. This causes the valves to open, and a signal is emitted by whistle assembly 38.

Once the fusible link 60 has melted, in order to restore the device to its operative condition, it is only necessary to manually restore lever 40 to its FIG. 3 position and place a new fusible link 60 in position. Link 60 is formed of a fusible material which melts at a predetermined temperature. When the ambient temperature reaches the said predetermined temperature, link 60 melts. Preferably, link 60 is formed of a metal alloy having a relatively low melting point. While the precise alloy to be employed depends on the exact use for which the alarm device 10 is to be put (i.e., upon the temperature at which it is desired that a warning signal be sounded), a preferred metal alloy is "Wood's metal", which comprises 50 percent bismuth, 25 percent lead, 12.5 percent tin, and 12.5 percent cadmium. "Wood's metal" has a melting range of 158–165°F., a Brinnel No. of 9.2, has 6000 p.s.i. tensile strength, and undergoes 2-inch elongation at 200 pounds slow pull.

The non-flammable propellant utilized in the alarm device 10 should be stable, nontoxic, and non-corrosive and should be of a type that will produce a substantial pressure inside the aerosol container 22 at the temperature at which it is desired that the alarm device 10 emit its warning signal. A preferred propellant is dichlorodifluoromethane, which is commonly known as "Freon-12". However, as will be apparent to one skilled in the art, many other propellants having the proper physical and chemical characteristics are available and can successfully be employed.

The operation of the alarm device 10 may be summarized as follows. Normally, the device 10 is disposed in the position shown in FIG. 1. When the ambient temperature reaches the predetermined melting range of the fusible link 60, the link 60 melts, and spring 50 acts on lever 40 and is thereby moved in the direction of arrow A, thereby opening the valves. The pressurized propellant then escapes through the tube 26 and whistle manifold 30 and whistle assembly 38, and a shrill warning sound is then emitted, so as to signal that the ambient temperature has reached the predetermined level.

Performance of the alarm device is improved if a capillary tube (not shown) is inserted in tube 32. The smaller diameter of the capillary tube results in a smaller quantity of the propellant escaping during a given length of time, thus adding to the length of time during which the warning signal is emitted.

It will be apparent to one skilled in the art that other thermally responsive means may be utilized to actuate the device 10. Thus, link 60 may be provided in the form of two partially overlapping parts interconnected by a fusible strip of metal alloy, such as "Wood's metal". Or, a bimetallic strip (not shown) adapted to flex at a predetermined temperature may be connected to lever 40, whereby flexing of the strip causes pivotal movement of lever 40 in order to permit the opening of the valve (as hereinbefore described). Similarly, lever 40 may be biased by a compressed spring (not shown) adapted to shift lever 40 upon melting of a fusible retaining member.

In accordance with a preferred aspect of the present invention, a unique mounting arrangement is provided for the fire alarm device 10 so that merely by visually observing the device it can be determined whether the supply of propellant in containers 22 is above a predetermined minimum level. Flange 18 of main bracket 12 is secured to a rear housing 70 (see especially FIGS. 1, 4, and 5) by suitable means such as bolting, soldering, or the like. Rear housing member 70 may be fabricated of metal grille work or the like in order to provide an attractive external appearance. A front housing member 72 (shown in broken lines in FIGS. 2 and 3) is formed of a similar material and is adapted to co-mate with rear member 70 so as to completely enclose the device 10. A convenient way for mounting front housing member 72 in place is via a projecting bolt 74 and a spacer nut 76 provided of flange 16 of bracket 12.

A pair of sidewardly projecting pivot pins 78 (only one of which is shown in FIG. 2 of the drawings) is provided at opposite ends of front housing 72 and pins 78 provide pivotal mounting points for the device 10. Pins 78 are adapted to be received in a mounting bracket 80, best shown in FIG. 6. Bracket 80 is secured to a suitable structural member such as a wall W (see FIG. 2) in the location in which the device is to be mounted. Bracket 80 comprises a longitudinal main section 82 from which forwardly project a pair of mounting arms 84, in each of which is provided a pivot slot 86 which is designed to receive one of the pivot pins 78 provided on the opposite ends of front housing member 72. Bracket 80 further comprises a lower projecting member 88 and an upper projecting member 90. Lower member 88 normally projects into an opening 92 provided in rear housing member 70 (see especially FIG. 4) and member 88 provides a supporting member adapted to prevent the device 10 in its housing from falling should either of the pins 78 be disengaged from its respective slot 86.

Member 90 functions as a convenient alarm test member. Member 90 projects through opening 92 such that when the housing for device 10 is manually rotated in a counterclockwise direction (as shown in FIG. 2) about pivot points 78, member 90 contacts whistle assembly 38, causes it to be displaced from its normal inoperative position, whereby the valves of containers 22 are opened and a test warning signal is emitted. Restoration of the device 10 to its normal position results in the valves closing and the alarm signal ceasing. Thus, by simply pushing the upper portion of the device, a warning sound may be obtained in order to test the operability of the device.

A further safety aspect of the device involves the pivotal mounting therefor. The center of gravity of device 10 is preselected such that whenever a predetermined weight of propellant (and hence a predetermined useful life) is present in containers 22, the center of gravity will be such that the position of the device about pivot point 78 will be in the first position identified by the reference numeral 72 shown in broken lines in FIG. 2 of the drawing. However, as propellant is used (as by the previously described testing procedure), propellant will be expelled and the weight thereof retained in containers 22 will be reduced. The center of gravity of the device 10 is such that whenever less than a predetermined weight of propellant is present in containers 22, the center of gravity will shift so that, under the influence of gravity, the device 10 pivots in a clockwise direction as shown in FIG. 2 toward a second position identified by the reference numeral 72' in FIG. 2. Member 88 serves a retaining function, since the lower edge of opening 92 contacts member 88 as the device pivots to its second position. Likewise, member 90 projecting into opening 92 serves as a retaining member limiting pivotal movement of the device beyond its first position.

Thus, by visual observation, it can immediately be determined whether at least a predetermined amount of propellant is provided in the containers 22. If the 72' position is observed, containers 22 may be replaced. Appropriate selection or adjustment of the center of gravity for the device is achieved by attaching a suitable weight 100 to flange 96 by means of a pair of bolts 102 (see FIGS. 1, 2, 4, and 5).

I claim:

1. A fire alarm device comprising:
   frame means;
   container means for holding pressurized propellant, the said container means being mounted on the frame means;
   valve means for normally retaining the propellant in the container means, the said valve means being adapted when actuated to release the pressurized propellant from the container means;
   signal means for emitting a warning signal upon release of the pressurized propellant;
   a lever pivotally mounted on the frame means by means of a pivot post member, pivotal movement of the lever being adapted to actuate the valve means the valve means being capable of actuation independently of the movement of the lever;
   biasing means mounted between the frame means and the lever urging the lever to pivot so as to actuate the valve means; and
   thermally responsive means mounted between the lever and the frame means for restraining pivotal movement of the lever, the thermally responsive means being adapted to permit the lever to pivot under the urging of the biasing means when the ambient temperature exceeds a predetermined temperature, whereby the device emits a warning signal whenever the ambient temperature reaches a predetermined level.

2. A device, as claimed in claim 1, wherein the biasing means is a spring mounted between the frame and the lever wherein the thermally responsive means is a fusible metal member mounted between the frame and the lever.

3. A fire alarm device, as claimed in claim 1, wherein:
   the container means comprises a plurality of individual containers; and
   wherein the valve means comprises an individual valve for each container, with a propellant distribution manifold being provided in fluid communication with each valve means and the signal means.

4. A device, as claimed in claim 3, wherein the lever is pivotally mounted such that pivotal movement thereof causes the manifold to move so as to open each valve.

5. A device, as claimed in claim 3, wherein the signal means is mounted on the manifold whereby physical displacement of the signal means causes each valve to open, whereby the device may be tested.

6. A fire alarm device, as claimed in claim 1, and further comprising:
   a mounting bracket including a pair of projecting arms, each arm having a pivot pin receptacle;
   a pair of pivot pins on the device, each pin being adapted to be pivotally received in a corresponding one of the pin receptacles whereby the device is pivotally supported in the bracket; and
   the center of gravity of the device being such that it is normally disposed in a first position when the supply of pressurized propellant is greater than a predetermined amount and that, when the supply of pressurized propellant is less than the said predetermined amount, the device pivots to its second position, whereby the presence of at least the said predetermined amount of propellant in the container means may be ascertained by visual observation.

7. Apparatus for mounting a pressurized propellant actuated device comprising:
   a mounting bracket including a pair of projecting arms each arm having a pivot pin receptacle;
   a pair of pivot pins provided on the device, each pin being adapted to be pivotally received in a corresponding one of the pin receptacles whereby the device is pivotable in a first direction and in a second direction;
   retaining means for limiting the pivotal movement of the device between a first position and a second position; and
   the center of gravity of the device being such that it is normally disposed in its first position when the supply of pressurized propellant is greater than a predetermined amount and that, when the supply of pressurized propellant is less than the said predetermined amount, the device pivots to its second position, whereby the presence of at least the said predetermined amount of propellant may be ascertained by visual observation.

8. Apparatus, as claimed in claim 7, wherein the pressurized propellant actuated device is a fire alarm device.